(12) United States Patent
Babij, Jr.

(10) Patent No.: US 7,104,167 B2
(45) Date of Patent: Sep. 12, 2006

(54) SCREW GUIDES AND CARTRIDGES

(76) Inventor: Alex Babij, Jr., 3 Glen Street, Galston, NSW 2159 (AU)

( * ) Notice: Subject to any disclaimer, the term of this patent is extended or adjusted under 35 U.S.C. 154(b) by 156 days.

(21) Appl. No.: 10/333,386

(22) PCT Filed: Jul. 18, 2001

(86) PCT No.: PCT/AU01/00870

§ 371 (c)(1),
(2), (4) Date: Jun. 20, 2003

(87) PCT Pub. No.: WO02/11952

PCT Pub. Date: Feb. 14, 2002

(65) Prior Publication Data

US 2004/0045999 A1 Mar. 11, 2004

(30) Foreign Application Priority Data

Jul. 18, 2000 (AU) .................................... PQ8841
Feb. 14, 2001 (AU) .................................... PR3088

(51) Int. Cl.
*B25B 23/04* (2006.01)
*B25B 23/06* (2006.01)
(52) U.S. Cl. ............................ 81/434; 81/120; 81/125
(58) Field of Classification Search ................ 81/434, 81/120, 125, 458; 227/149, 147, 130; 144/32; 145/52

See application file for complete search history.

(56) References Cited

U.S. PATENT DOCUMENTS

| 4,003,417 | A |   | 1/1977 | Cornwell |
| 4,062,388 | A | * | 12/1977 | DeCaro ...................... 81/57.37 |
| 5,065,649 | A |   | 11/1991 | Evers et al. |
| 5,568,753 | A | * | 10/1996 | Habermehl et al. ........... 81/434 |
| 5,943,926 | A | * | 8/1999 | Habermehl ................... 81/434 |

FOREIGN PATENT DOCUMENTS

GB  2 198 066 A  6/1988

* cited by examiner

*Primary Examiner*—Lee D. Wilson
*Assistant Examiner*—Alvin J. Grant
(74) *Attorney, Agent, or Firm*—Egbert Law Offices

(57) ABSTRACT

A screw alignment device for assisting engagement of a screw driving tool during a fastening operation with a screw of the type having a shank disposed between a head end and a front end, the screw tool being of the type having a shaft with a gripping formation at one end thereof for engagement with the screw head. The screw alignment device includes a screw guide having a body of generally annular configuration formed from a resilient material and having an internal capacity of generally frusto-conical configuration. There is also a tool guide spaced rearwardly from the screw guide and aligned with the cone axis. The device further includes a connector which connects the screw guide to the tool guide.

39 Claims, 9 Drawing Sheets

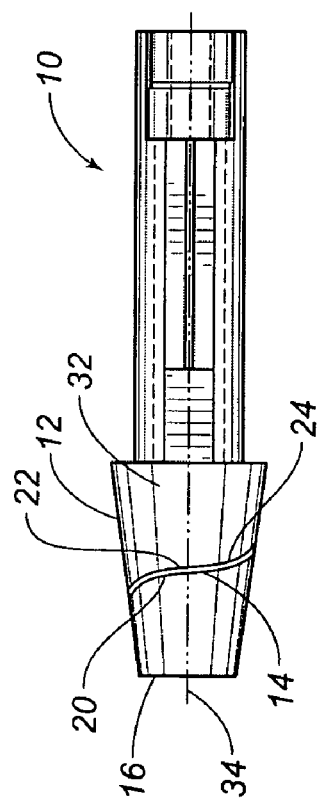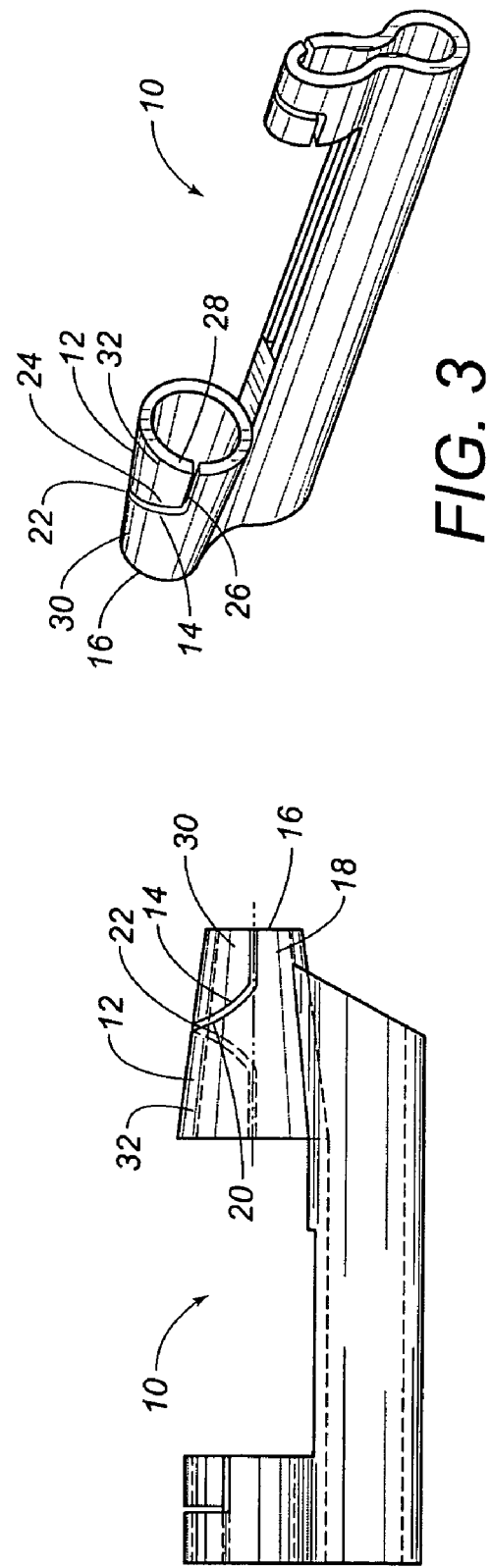

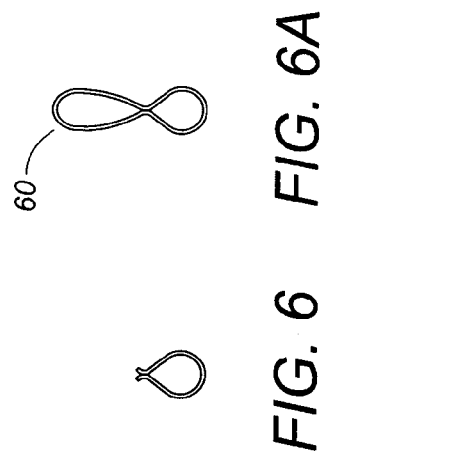
FIG. 6  FIG. 6A
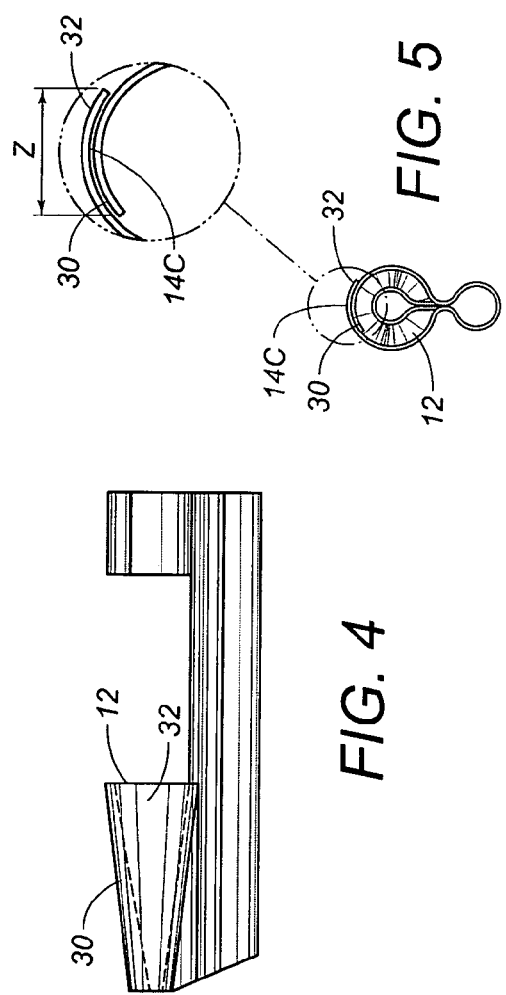
FIG. 5
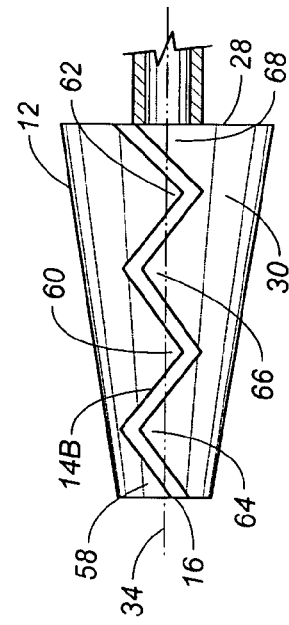
FIG. 4
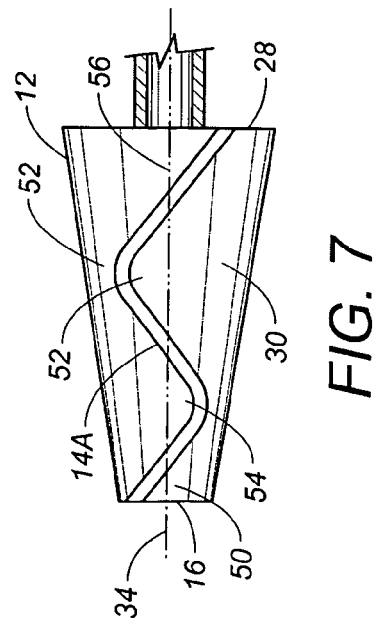
FIG. 8
FIG. 7

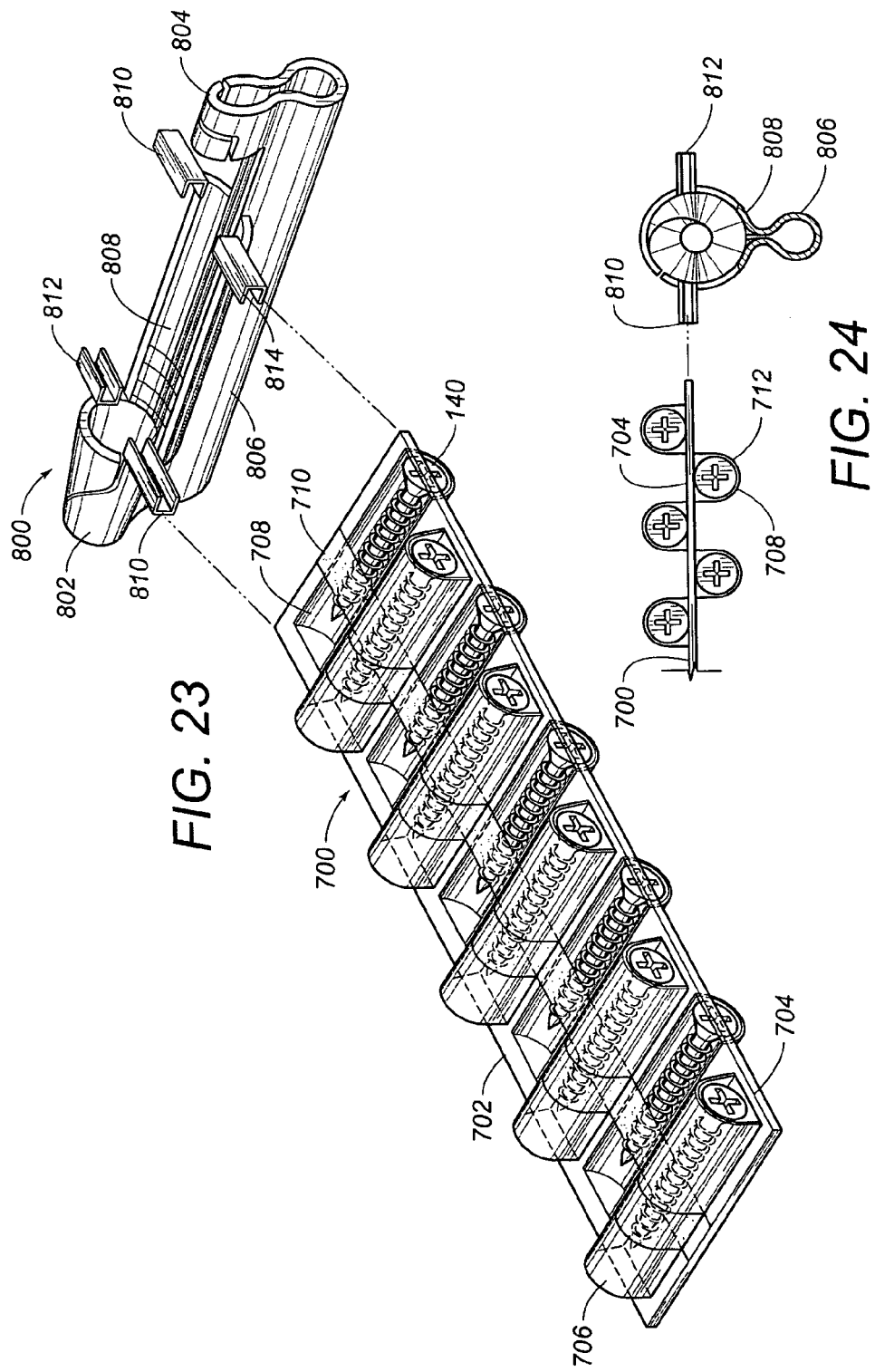

SCREW GUIDES AND CARTRIDGES

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to improvements to screw guides and cartridges such as those described in co-pending application PCT/AU01/00870.

BACKGROUND OF THE INVENTION

Due to variability of finished product, variations due to manufacturing tolerances and similar manufacturing difficulties, some screw alignment devices as described in PCT/AU00/00676, may in use from time to time have one or both of the head of a screw and or the screw driving end of the screw driver pop out of the screw guide.

Further, the cartridges and screw guides described in PCT/AU00/00676 can be complex to manufacture and thus the cost of manufacture can be such that the pricing in the market place of the cartridge system will be greater than the market is prepared to pay. Thus it is desirable to develop a screw alignment guide and a cartridge system which is conducive to relatively low cost manufacture.

The applicant does not concede that the subject matter of PCT/AU00/00676 is a part of the common general knowledge of persons skilled in this art.

BRIEF SUMMARY OF THE INVENTION

According to first aspect of the present invention, there is provided a screw alignment device for assisting engagement of a screw driving tool during a fastening operation with a screw of the type having a shank disposed between a head end and a front end, the screw driving tool being of the type having a shaft with a gripping formation at one end thereof and an engaging formation at the other end thereof for engagement with the screw head, the screw alignment device including:
  a screw guide having a body of generally annular configuration formed from a resilient material and having an internal cavity of generally frusto-conical configuration tapering convergently towards a forward end of the device, said screw guide including therein a slit therethrough wherein the slit provides an overlapping portion of one side of said screw guide with respect to the other side of said screw guide so that when overlapping portions of said screw guide on either side of said slit are moved apart with respect to each other as said screw head passes through said screw guide, said overlapping portions remain in an overlapped condition;
  a tool guide spaced rearwardly from the screw guide and aligned generally with the cone axis; and
  a connector which connects the screw guide to the tool guide; where, in use, a screw is located in the screw guide so as to be aligned generally with the cone axis, the front end of the screw projecting through said forward end and the head of the screw being held by the screw guide, and a tool passing through the tool guide can be engaged with the screw head thereby holding the tool and screw aligned, and by driving the screw forwardly, the head of the screw will cause the screw guide to flex outwardly to permit the screw to pass through the screw guide.

The overlapping portions can be formed on either side of a generally circumferential closed slit which allows one side of said overlapping portion to slide over the other. The screw head size will need to be predetermined to prevent the overlapping portions from being separated to the point of not overlapping in rise.

Alternatively the overlapping portion can be formed by a radially directed slit through the guide which also extends axially along the guide so that the slit lies on either side of a longitudinal axis of the screw guide. Such a slit can be shaped in a sinusoidal fashion, a zig zag fashion or other shape to produce at least one projection or finger which overlaps or lies across a straight line axis of said screw guide. By this means there is formed a slit such that at the furthest expansion of the slit, for a predetermined size of screw head passing through said screw guide when in use, the extremities of the at least one projection or finger on one side of the slit will not move past the extremities on the other side. Thus as an example the interlacing of the cuneiform portions of a zig zag on one side with the cuneiform portions on a zig zag on the other side, will allow for the expansion of the slit without providing a clear radially directed path out of the screw guide for said screw head or said tool.

The present invention provides a screw alignment device for use with a screw driving tool and a screw during a fastening operation, with said screw being of the type having a shank disposed between a screw head and a distal end, the screw driving tool being of the type having a shaft with a gripping formation at one end thereof and a screw engaging formation at the other end thereof for engagement with the screw head, said screw alignment device including:
  a screw guide having a body of generally annular configuration formed from a resilient material and having an internal cavity of generally frusto-conical configuration tapering convergently towards a forward end of the screw guide;
  a tool guide spaced rearwardly from the screw guide and aligned generally with frusto-conical configuration;
  a connector which connects the screw guide to the tool guide;
  at least one cartridge receiving formation between said screw guide and said tool a cartridge member thereon from which cartridge member at least one screw can be dispensed.

In use, a screw located on said cartridge is aligned with said screw guide and is engageable by said tool and moveable by the tool into the screw guide so as to be aligned generally with said axis of said frusto-conical configuration and so that the distal end of the screw projects through said forward end and the head of the screw being held by the screw guide, said screw and said tool being releasably held together in substantial alignment. By driving the screw forwardly into a surface to receive said screw, said head of said screw will cause the screw guide to flex outwardly to permit the screw to pass through the screw guide.

The at least one carriage receiving formation can include means to releasably hold said cartridge member thereon.

The cartridge receiving formation can include means to index the movement of said cartridge through or across said cartridge receiving formation.

The cartridge receiving formation can include a forward and rearward flange to slidably hold said cartridge member. Said flanges can include at least one projection or depression thereon for engaging said cartridge member.

The cartridge receiving formation is preferably generally planar.

The cartridge receiving formation can be formed as part of said connector.

Preferably said screws are held onto said cartridge by means of adhesive. The adhesive can be in the form of adhesive tape.

The screws can be dispensed from said cartridge by means of axial force and or by the rotation screw by said tool.

The cartridge can include screw thread engagement means so as to enable the screw to be rotated on the cartridge and translate thereacross. The screw thread engagement means can be a forward and rear holding member so as to hold each screw at a forward and rearward location. Said forward and rearward members being spaced relative to each other and space from said screw guide when in use such that as said screw is rotated so as to travel towards said screw guide, said screw travels through said rearward member and breaks therethrough. By this time the forward end of said screw will be in said screw guide and remains aligned by virtue of the screw guide and the hold of said forward member. Further rotation of said screw will then break the hold of said forward member allowing the screw to proceed through the screw guide.

Alternatively the screw thread engagement means can be a series of depressions or projections to engage a screw thread. The series of depressions and or projections can be formed into the base of said cartridge or on a separate member which is attachable to said cartridge. The screw thread engagement means can alternatively be an adhesive, plastic or silicon holding formation which secures a screw to a cartridge base. The holding formation can be sufficiently rigid so that once set, a screw can be rotated in the holding formation allowing said screw to translate relative to the holding formation.

The cartridge can include indexing means so that as said cartridge moves in said cartridge receiving means said cartridge will stop moving when a screw is aligned with said tool and said screw guide. The indexing means can include one or more projections or depressions associated with said cartridge receiving means which will cooperate with depressions or projections on said cartridge.

Preferably the cartridge includes a multiplicity of screws thereon.

Preferably said cartridge includes a profiled cross section to accommodate the shape of a screw so that each screw can be presented to said tool with its axis of rotation generally coincident with the axis of rotation of said tool.

The cartridge can be manufactured from any suitable material such as cardboard, polymeric material etc.

Preferably said cartridge is colored so that the color represents the type of screw on the cartridge or the use of those screws; such as for use with metal; or for use with hardwoods; or for use with medium or softwoods; or for use with plaster board; etc.

The cartridge receiving means can be discrete channel portions mounted on the rear end of said screw guide and the forward end of the tool guide. The connector can include a concave upper surface which will cooperate with said channel portions to slidably capture and or index said cartridge.

A cartridge used with such a cartridge receiving means can have a series of pockets which have an surface which is convex.

If desired the cartridge can have a series of pockets on only one side. Alternatively there can be present a series of pockets on both sides, so that after dispensing screws contained in the pockets from one side of said cartridge the cartridge can be flipped through 180 degrees to dispense the screws from the pockets on the other side.

Such a cartridge can includes at least one rail portion which extends along one edge of the cartridge edge is preferably a forward or rear edge.

Preferably there are two such rail portions. The rail portions fitting into said channel portions for guide movement of said cartridge in said rail portions. The rail portions can also serve to retain screws in said pockets.

Preferably the cartridge is reusable.

The spacing of said channel portions from said connector is such it is less than the spacing of said rail on said cartridge to the convex outside surface of the pockets. By this means a pocket can be situated adjacent said concave surface of said connector with said rail located in said channel until forced from this position. Also by this means an indexing system is produced.

BRIEF DESCRIPTION OF THE SEVERAL VIEWS OF THE DRAWINGS

Embodiments of the present invention will now be described by way of example only with reference accompanying drawings.

FIG. 1 illustrates a plan view of a screw alignment device.

FIG. 2 illustrates a right side elevation view of the screw alignment device of FIG. 1.

FIG. 3 illustrates a left side elevation view of the screw alignment device of FIG. 1.

FIG. 4 illustrates a side elevation view of another screw alignment device.

FIG. 5 illustrates a cross sectional view through the screw guide of the apparatus of FIG. 4.

FIG. 6 illustrates a cross sectional view through the connector of the screw alignment device of FIG. 4.

FIG. 6A illustrates a cross sectional view through the tool guide of the screw alignment guide of FIG. 4.

FIG. 7 illustrates a schematic view of a radial slit having an axially extending sinusoidal shape through a screw guide.

FIG. 8 illustrates a schematic view of a radial slit having an axially extending zig zag shape through a screw guide.

FIG. 23 illustrates a rear perspective view of a further screw alignment guide and cartridge system.

FIG. 24 illustrates a cross sectional view through the screw alignment guide of FIG. 23 with the cartridge of FIG. 23 shown in rear elevation.

DETAILED DESCRIPTION OF THE INVENTION

Figure 9:
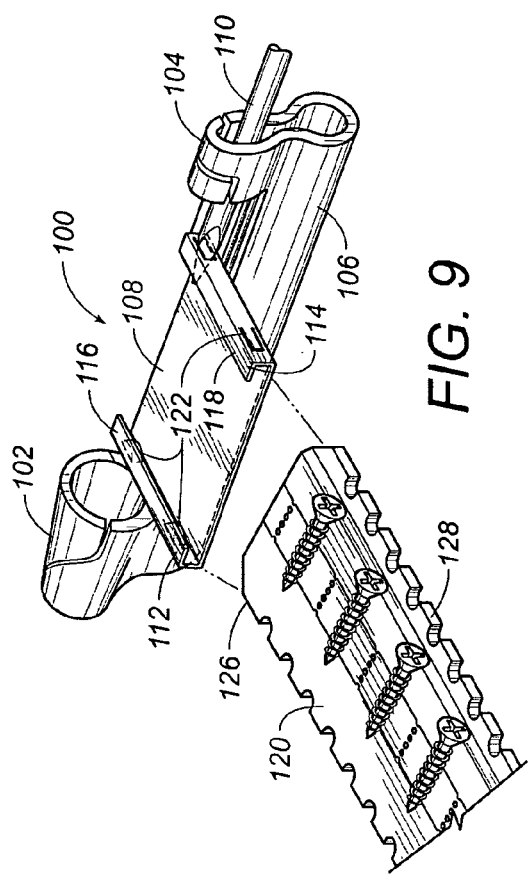
FIG. 9 illustrates a perspective view of a screw alignment device and cooperating cartridge.

Illustrated in FIGS. 1 to 3 is a screw alignment device 10. The screw alignment device 10 functions and is constructed in the same manner as that described in PCT/AU00/00676 and that description is incorporated herein by reference.

As can be seen from FIGS. 1 to 3, the frusto-conical shaped screw guide 12 has a radial slit 14 (radial in the sense that the separation plane through the slit extends through the screw guide 12 in a radial direction) which also extends axially along the surface of the screw guide 12. The slit 14 starts on the forward end 16 of the screw guide 16 on the right side of the screw guide 12 at location 18. The slit 14 then progresses in a straight line for a portion and then moves in a helical or slanted direction at 20 until a mid point (both with respect to the length and the width of the screw guide 12) is reached at 22. Then a similar shaped section 24 takes a helical or slanted path through the screw guide 12 as in FIG. 3, with the slit 14 terminating in a straight line path section 26 which terminates at the rear end 28 of the screw guide 12 on the left side thereof.

This slit 14 forms a portion 30 on one side of the screw guide 12 and a second portion 32 on the other side. The portions 30 and 32 are effectively projections or fingers which circumferentially extend around the longitudinal axis 34. Thus when a screw head is made to pass through the screw guide 12 in the same manner as described in the specification of PCT/AU00/00676, the portions 30 and 32 will move away from each other thereby causing the slit 14 to become wider. However as the portions 32 and 30 effectively form fingers or projections which as can be seen from FIG. 1 extend over the center line 34, as the screw guide expands no path is provided for a screw head or the screw diving tool to radially escape from the screw guide 12.

Illustrated in FIGS. 7 and 8 are alternatively configured radial slits 14A and 14B. In FIGS. 7 and 8 like parts have been like numbered with the embodiment illustrated in FIGS. 1 to 3. In the embodiments of FIGS. 7 and 8 the two portions 30 and 32 each have as in FIG. 7 fingers or projections 54 & 56 and 50 & 52, while in FIG. 8 the zig zag pattern provides fingers or projections (of cuneiform shape) 58 & 60 & 62 on portion 32 and 64 & 66 & 68 on portion 30. As can be seen in FIGS. 7 and 8, the slits 14A and 14B can be opened out quite considerably without the fingers or projections on portion 30 crossing over a vertical plane through longitudinal axis 34. These arrangements will thus also not provide a path for a screw head or a screw diving tool to radially escape from the screw guide 12 as the slits 14A and 14B expand.

Illustrated in FIGS. 4,5,6, and 6A is another embodiment which functions in a similar manner to those described above except that a generally circumferential slit 14C (circumferential in the sense that the separation plane through the slit extends through the screw guide 12 in a circumferential direction) is provided between the portions 30 and 32. Thus the portions 30 and 32 act as overlapping flaps which overlie each other along the whole of the axial length of the screw guide 12, with a limit of circumferential overlap (see dimension Z in the enlarged view) being the amount of circumferential expansion the screw guide will take before a path is provided which will allow a screw head or the screw driving tool to escape the screw guide 12 in a radial direction therefrom.

If desired, a similarly constructed overlap 60 can be provided on the tool guide portion 62 at the rear of the screw alignment device, as an alternative for the tool guide construction of the embodiments described in PCT/AU00/00676.

The embodiments of FIGS. 1 to 3 and 7 and 8 are readily adapted to a screw alignment device, which is manufactured from nylon or from other polymeric materials such as those described in PCT/AU00/00676 and are adapted for injection molding. Whereas the embodiment of FIGS. 4,5,6 and 6A readily adapted to a screw guide when manufactured from sheet metal such as that specified in PCT/AU00/00676.

Figure 11:
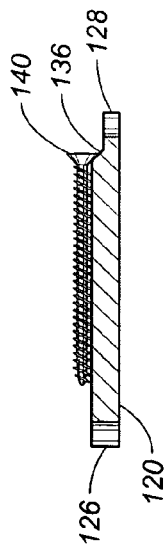
FIG. 11 illustrates a cross sectional view through the line A—A of the cartridge of FIG. 10.
Figure 10:
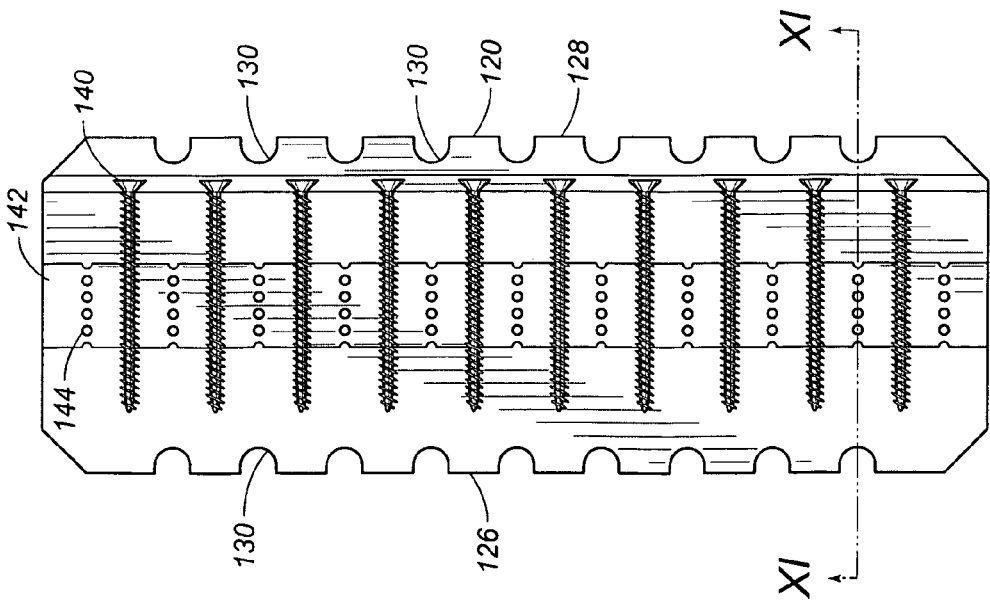
FIG. 10 illustrates a plan view of the cartridge with screws mounted thereon.

Illustrated in FIGS. 9 to 11 is an embodiment of a screw alignment device 100 having a screw guide 102 at its forward end and a tool guide 104 at its rearward end. The screw guide 102 and the tool guide 104 are connected together by means of a connector 106 and are preferably integrally formed together.

The connector 106 has thereon a cartridge receiving formation in the form of a platform 108. The platform 108 is positioned so as to be below an imaginary line representing the axis of rotation of a screw driver 110, which axis extends from the screw guide 102 to the tool guide 104.

Attached to and extending above the platform 108 is an L-shaped forward flange 112 which has its upper portion 116 extending in a rearward direction, and an L shaped rearward flange 114 which has its upper portion 118 extending in a forward direction.

The platform 108 and flanges 112 and 114 are integrally molded with the connector 106, screw 102 and tool guide 104.

The distances between the lower faces of portions 116 and 118 and the upper face of the platform 108 are approximately the thickness of a forward edge 126 and a rearward edge 128 respectively of a cartridge 120. As can be seen from the cross section of FIG. 11, the forward edge 126 of the cartridge 120 is of greater thickness by comparison to the rearward edge 128. The purpose of this will be described later.

As is also illustrated in FIG. 9, the L-shaped flanges 112 and 114 each have two curved projections 122 thereon. These projections 122 extend into the bights 130 on the cartridge 120 so that in use, when the projections 122 are located in the bights 130 a screw 140 will be located generally coincidently with the axis of rotation of the screw driver 110.

Each screw 140 is held in spaced relation from adjacent screws by means of adhesive tape 142. The adhesive tape 142 includes on either side of each screw 140 a series of perforations 144 which assist the screw when in use in a screw alignment device 100, to break away therefrom. The adhesive tape 142 can also include a lubricant, which may be the adhesive or another lubricant added to the tape 142. The lubricant or the adhesive can assist in reducing the friction associated with the screw being driven into a material.

Thus the screw 140 can be dispensed from the cartridge 120 by means of axial force exerted by the screw driver 110, or by axial force produced by the rotation of the screw 140 relative to the cartridge 120 by means of the screw driver 110.

As is illustrated in FIG. 11, an inclined plane 136 is present between the rearward edge 128 and the forward edge 126. This inclined plane 136 allows the screw to be mounted on to the cartridge so that its axis of rotation is substantially coincident with the axis of rotation of the screw driver 110, when the cartridge is positioned on the platform 108 with projections 122 in the bights 130.

Figure 12:
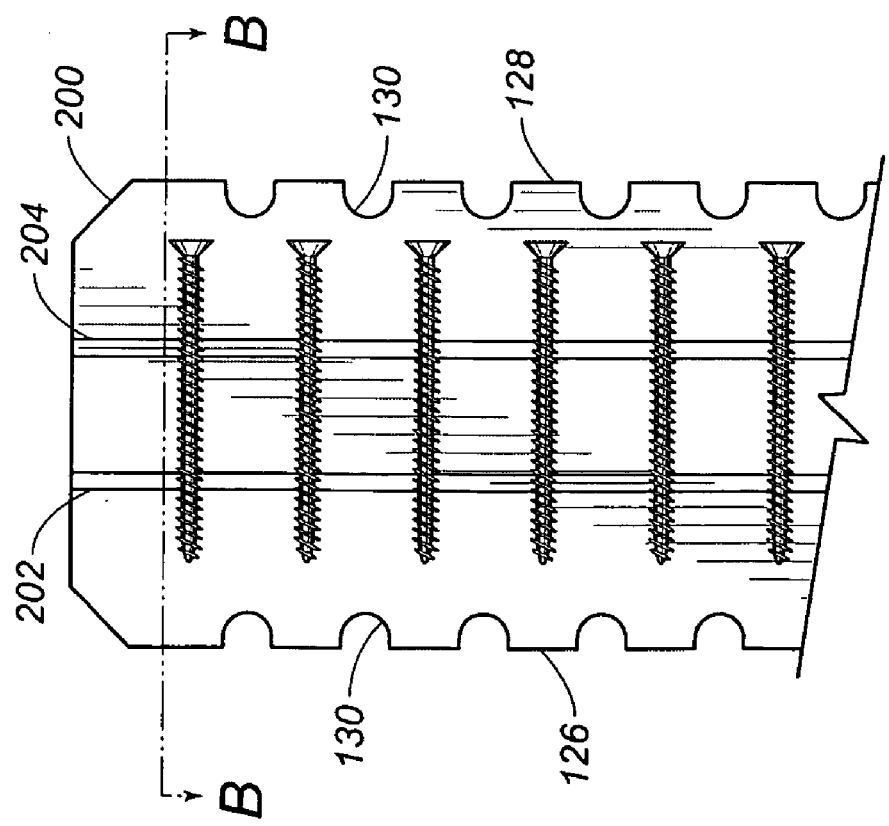
FIG. 12 illustrates a plan view of a cartridge similar to that of FIG. 10 and 11, except that the screw are held by mechanical means.

Illustrated in FIG. 12 is an alternative cartridge 200 which is similar in shape to the cartridge 120 described above and like parts have been like numbered. Where the cartridges 100 and 200 differ is that the cartridge 200 has a forward rail 202 and rearward rail 204. Both rails 202 and 204 are formed by folding and gluing (or sonic welding or other appropriate joining process) the cardboard or sheet material from which the cartridge 200 is manufactured. This is illustrated in the cross section of FIG. 13.

If it is desired the rails 202 and 204 can have a series of slots therein so that the screws 140 can be snapped into position on the cartridge 200. Alternatively there can be holes formed in the rails 202 and 204, before or after the folding and joining process. Respective holes on rail 202 being in line with respective holes in rail 204, so as to receive a screw 140 therein.

Figure 13:
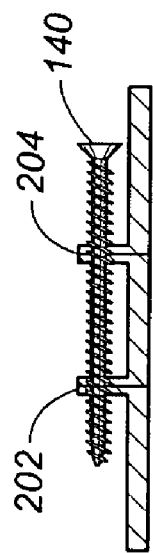
FIG. 13 illustrates a cross sectional view through the line B—B of FIG. 12 where the cartridge of FIG. 12 is manufactured from folded cardboard.

As can be seen from FIG. 13 the height of the rails 202 and 204 above the upper surface of the cartridge 200 is such that the screw 140 can have its shank, and thus its axis of rotation, generally parallel to the upper surface of the cartridge 200. This means that unlike the cartridge 120 described earlier, the cartridge 200 does not require a thicker forward edge by comparison to the rearward edge. As a consequence the respective heights of L-shaped flanges 112 and 114 of FIG. 9 can be the same height to receive this cartridge 200.

Figure 14:
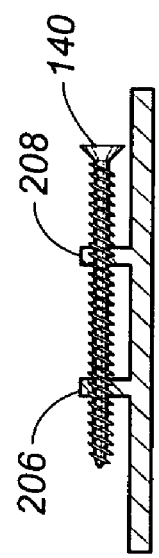
FIG. 14 illustrates a similar cross sectional view through the line B—B of FIG. 12 where the cartridge is of FIG. 12 is manufactured from injection molded plastic.

If it was desired to manufacture the cartridge 200 from injection molded plastic it would have a cross section as illustrated in FIG. 14. In which case respective holes in the rails 202 and 204 can be formed to receive the screws 140. Alternatively, as the cartridge 200 can be injection molded the cartridge 200 can be injection molded around an array of screws, thereby molding and packaging in one step.

Th cartridges 120 and 200 can be color coded so as to indicate the types of screws mounted on the cartridge. For example a blue color can be used to indicate that the screws are for use with metals; a red color to indicate that the screws are for use with hardwoods; or an orange color to indicate that the screws are for use with medium or softwoods; or a white color to indicate that the screws are for use with plaster board. In the case of injection molded or plastic cartridges 120 or 200 the color can be contained within the plastics material, or the plastics material can be the color concerned. In the case of cartridge 120 being manufactured from cardboard an adhesive tape 142 can be used having these colors.

Figure 15:
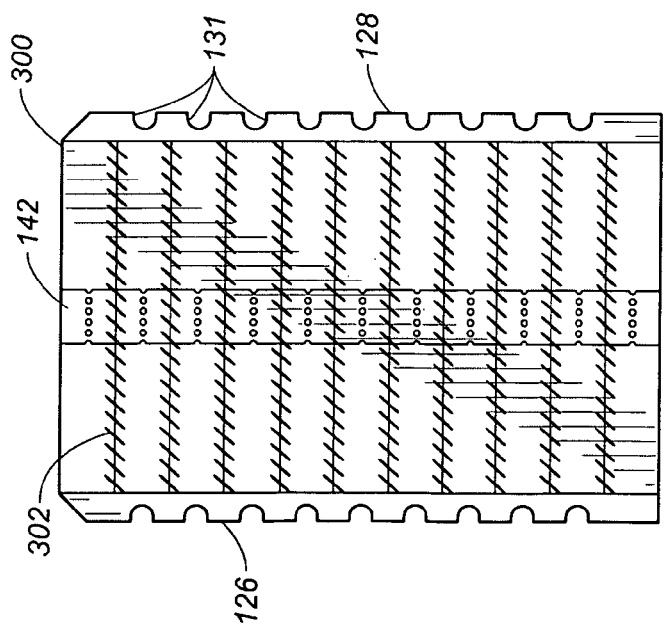
FIG. 15 illustrates a a plan view of a cartridge assembly similar to that of FIG. 10, with screw engagement means.
Figure 16:
FIG. 16 illustrates a side view of the cartridge of FIG. 15.

Illustrated in FIGS. 15 and 16 is a cartridge 300 which is similar to the cartridge 120 of FIG. 10 and like parts have been like numbered. The cartridge 300 differs from the cartridge 120 by the presence of a series of formations 302, in this case depressions, which are impressed into the cardboard or plastic of the cartridge 300. Alternatively the formations 302 can be projections formed on or added to the top surface of the cardboard or plastic of the cartridge 300.

The formations 302 act as screw thread engagement formations so that when a screw thread is positioned on the cartridge 300 and secured thereto by adhesive frangible tape 142, the depressions and or projections in the formations 302 will allow translation of a screw 140 when that screw 140 is rotated on the cartridge 300. As can be seen in FIG. 16, as the formations 302 are raised, a screw 140 can have its shank substantially coincident with the axis of rotation of the screw driver 110, without the need for a tapered base like that of FIG. 11.

The pitch or distance between adjacent projections, adjacent projections and depressions or adjacent depressions in the formations 302 are preferably the same as the pitch of the screw thread on the screw 140 so as to provide the best possible thread interaction.

Figure 17:
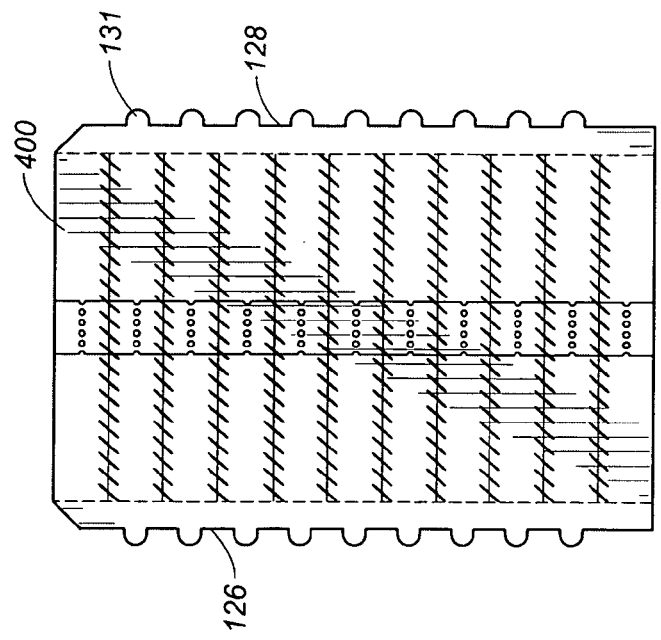
FIG. 17 illustrates a plan view cartridge similar to FIG. 15.

Illustrated in FIG. 17 is a plan view of a cartridge 400 similar to that of FIG. 15, with like parts being like numbered. The cartridge 400 differs from cartridge 300 by the left and right edges 126 and 128 of the cartridge 400 having a series of indexing projections 131, which will engaged a series of depressions or apertures (not illustrated) which would replace the projections 122 present on the L-shaped flanges 112 and 114 of the screw alignment guide 100 of FIG. 9. The cartridge 400 will thus function in the same manner as the previously described cartridges.

Figure 20:
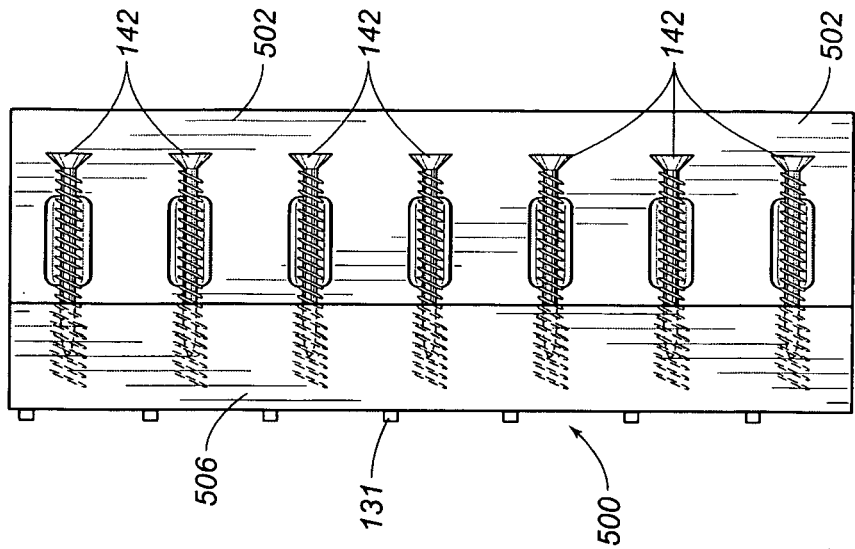
FIG. 20 illustrates a plan view of the cartridge of FIG. 19.
Figure 18:
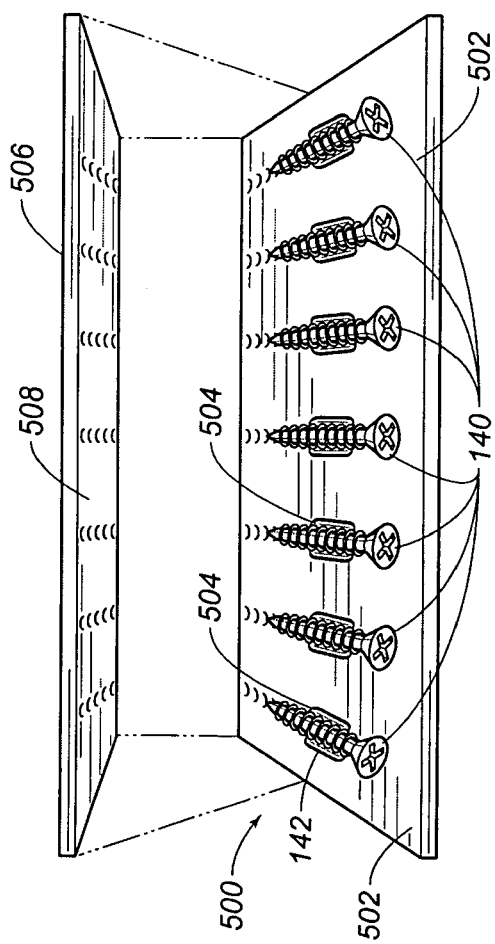
FIG. 18 illustrates an exploded perspective view of an alternative cartridge.
Figure 19:
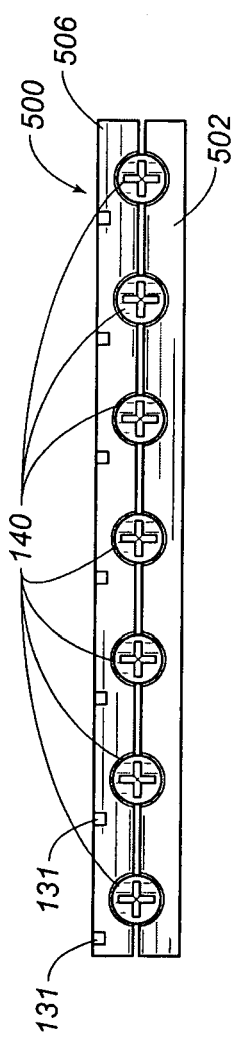
FIG. 19 illustrates a front elevation view of the cartridge of FIG. 18 when assembled.

Illustrated in FIGS. 18 to 20 is another cartridge 500. For ease of illustration the other features of the previously described cartridges are not drawn with only the means of attachment and dispensing being shown. In the cartridge 500, the screws 140 are secured to a base 502 by means of a small quantity of silicone, plastic of other adhesive 504.

The silicone, plastic or other adhesive 504 can also serve a lubrication function, or if desired a lubricant can be added to the adhesive or the screw so as to assist in reducing the friction associated with the driving of a screw into a material.

Once secured, over the ends of the shanks of the screws 140 a cardboard or plastic strip 506 is adhered to the base 502 sandwiching the ends of the screws 140. The strip 506 has an array of formations 508 which are a series of depressions and projections, or a series of depressions, or a series of projections which will serve as screw thread engagement formations similar to the formations 302 of FIG. 14.

As is illustrated in FIG. 20 the strip 506 can have along its outboard edge as series of projection serve the indexing function described above.

Figure 21:
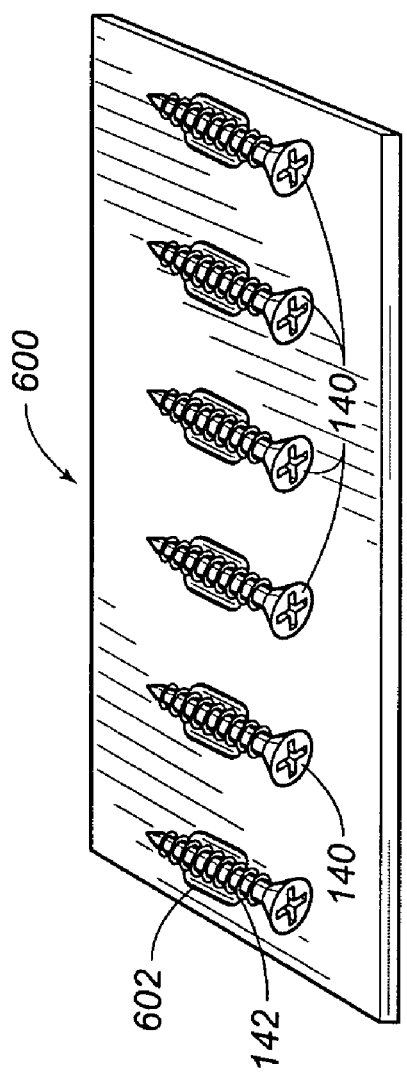
FIG. 21 illustrates a perspective view of an alternative means to attach screws to a cartridge.
Figure 22:
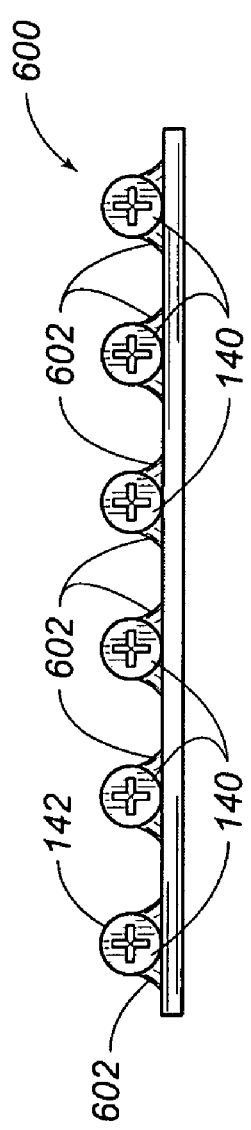
FIG. 22 illustrates a front elevation view of the cartridge of FIG. 21.

Illustrated in FIGS. 21 and 22 is another cartridge 600. For ease of illustration the other features of the previously described cartridges are not drawn with only the means of attachment and dispensing being shown. In this embodiment the cartridge 600 has the screws 140 attached to it by means of silicon, adhesive or melted plastic 602 which is able to set sufficiently so that once set, a screw 140 can be rotated on the cartridge 600 and thereby be translated on the cartridge for insertion into a surface to receive the screw 140.

Illustrated in FIGS. 23 and 24 is an alternative cartridge 700 for use with an alternative screw alignment guide 800. The screw alignment guide 800 is similar to the screw alignment guide of previous Figures in that there is present similarly shaped screw guide 802, tool guide 804 and a connector 806 joining them. The connector 806 differs from those above in that there is provided a concave upper surface 808 whose purpose will be discussed below.

The rear of the screw guide 802 includes a left channel 810 and a right channel 812 which are in alignment with each other and which extend away from the screw guide 802. Similar left and right channels 814 and 816 extend away from the tool guide 804. The channels 814 and 816 are also in alignment with each other as well as with channels 810 and 812.

The channels 810, 812, 814 and 816 receive a rail 702 and 704 on the cartridge 700. The rails 702 and 704 extend along the front and rear sides of the cartridge 700.

The cartridge 700 is formed from a corrugated base 706. The corrugated base 706 has corrugations along both its upper and lower faces. Each corrugation forms a pocket or cavity 708 in which can be positioned a screw 140. The screws 140 are held in place by means of a tape 710 which can be color coded and or lubricated as described above. Of course the screws in the pockets on the lower surface of the base 706 will be held in place by tape as well.

In use the rails 702 and 704 are slid into the left channels 810 and 814, (or the right channels 812 and 816) until the outside undersurface 712 of the first pocket 708 engages the outside edge 820 of the connector 806 as illustrated in FIG. 24. This engagement occurs because the height or spacing of the channels 810, 812, 814 and 816 from the edge 820 is not as great as the height or spacing of the rails 702 and 704 from the furthermost point on the outside surfaces 712 of the pockets 708. Because the cartridge has some inherent flexibility, the user can push the cartridge so that the surface 712 rides over the edge 820 and locates the surface 712 into the concave formation of upper face 808 of connector 806. From this location the screw 140 in the pocket 708 can be dispensed.

By application of force on the cartridge 700 relative to the screw alignment guide 800, the cartridge 700 can be moved in an indexed manner to the next pocket 708 which contains a screw to be dispensed.

Once all screws on one face of the cartridge 700 have been dispensed the cartridge 700 can be flipped 180 degrees and screws from the other face dispensed.

If desired instead of tape to hold the screws 140 in position on the cartridge 700, the base 706 can be made wholly from plastic with an under and upper surface being present for each pocket so as to surround the screw leaving only openings at the front and rear for insertion of the screw and its dispensing from the cartridge. This could be made by upper and lower corrugated sheets being joined together to sandwich screws therein effectively placing each screw into a tube like formation.

Figure 25:
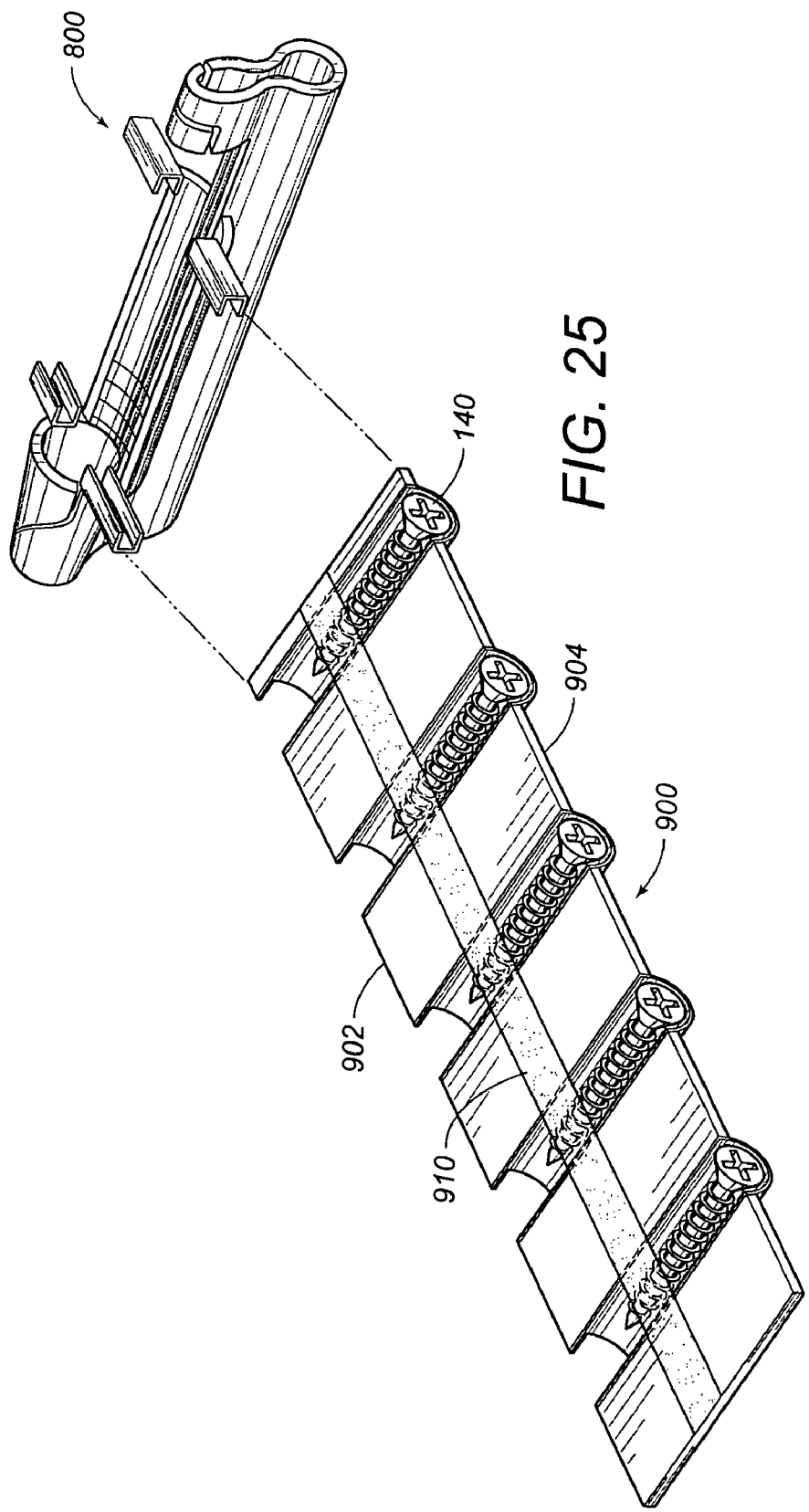
FIG. 25 illustrates a perspective view of a cartridge similar to that in FIG. 23 with a single level of screws.

The cartridge 700 is illustrated as having upper and lower faces with screws located in both faces. If desired a cartridge 900 as illustrated in FIG. 25, having a single face containing screws can be utilized. The cartridge 900 has intermittent rails 902 and 904 at the forward and rearward sides. A tape 910 of appropriate color can be used to hold the screws in position and if desired the tape 910 can include a lubricant or its adhesive can provide lubrication for the screws.

Throughout the above description of embodiments it has been described how adhesive or similar can be used as a lubricant to lubricate the entry of a screw into a material. An adhesive can be chosen having such lubrication properties and which will also be suitable for the screw retention requirements with respect to the cartridge.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those in the art can be made thereto, without departing from the scope of the present invention.

I claim:

1. A screw alignment device for assisting engagement of a screw driving tool during a fastening operation with a screw, the screw having a shank disposed between a head end and a front end, the screw driving tool having a shaft with a gripping formation at one end thereof and an engaging formation at another end thereof suitable for engagement with the screw head, the screw alignment device comprising:

a screw guide having a body of a generally annular configuration formed from a resilient material and having an internal cavity of generally frusto-conical configuration tapering convergently towards a forward end thereof, said screw guide having a slit extending therethrough wherein said slit is shaped so as to provide said screw guide with an overlapping portion on a first side of said slit and an overlapping portion on a second side of said slit so that when said overlapping portions of said screw guide on said first and second sides of said slit are moved apart with respect to each other as said screw head passes through said screw guide, said overlapping portions remain in an overlapped condition;

a tool guide spaced rearwardly from said screw guide and aligned generally with an axis of said internal cavity; and a connector which connects said screw guide to said tool guide;

where, in use, the screw is located in the screw guide so as to be aligned generally with said axis, the front end of the screw projecting through said forward end and the head of the screw being held by said screw guide, and the tool passing through said tool guide can be engaged with the screw head thereby holding the tool and the screw aligned, and by driving the screw forwardly, the head of the screw will cause said screw guide to flex outwardly to permit the screw to pass through said screw guide.

2. The screw alignment device of claim 1, where said overlapping portions are formed on either side of a generally circumferential closed slit which allows one side of the overlapping portion to slide over the other.

3. The screw alignment device of claim 1, said overlapping portions remain overlapping in use with for a predetermined screw head.

4. The screw alignment device of claim 1, wherein said overlapping portions are formed by a radially directed slit through said screw guide which slit also extends axially along said screw guide so that the slit lies on either side of a longitudinal axis of said screw guide.

5. The screw alignment device of claim 4, wherein said slit has a shape selected from the group consisting of sinusoidal, zig zag, a shape having cuneiform projections, and a shape which produces at least one projection which overlaps or lies across a straight line axis of said screw guide.

6. The screw alignment device of claim 5, wherein at a furthest expansion of said slit extremities of the projection or finger on said first side of the slit will not move past extremities on said second side of said slit.

7. A screw alignment device for use with a screw driving tool and a screw during a fastening operation, the screw having a shank disposed between a screw head and a distal end, the screw driving tool having a shaft with a gripping formation at one end thereof and a screw engaging formation at another end thereof suitable for engagement with the screw head, the screw alignment device comprising:
- a screw guide having a body of a generally annular configuration formed from a resilient material and having an internal cavity of generally frusto-conical configuration tapering convergently toward a forward end of said screw guide;
- a tool guide spaced rearwardly from said screw guide and aligned generally with an axis of said frusto-conical configuration;
- a connector which connects said screw guide to said tool guide;
- at least one cartridge receiving formation between said screw guide and said tool guide; and
- a cartridge member on the cartridge receiving formation from which the screw can be dispensed.

8. The screw alignment device of claim 7, wherein in use, the screw located on said cartridge member is aligned with said screw guide and is engageable by said tool guide and moveable by the tool into said screw guide so as to be aligned generally with said axis of said frusto-conical configuration and so that the distal end of the screw projects through said forward end and the head of the screw is held by said screw guide, the screw and the tool being releasably held together substantially in alignment.

9. The screw alignment device of claim 7, wherein by driving the screw forwardly into a surface suitable for receiving the screw, the head of the screw will cause said screw guide to flex outwardly to permit the screw to pass through said screw guide.

10. The screw alignment device of claim 7, wherein the cartridge receiving formation has means for releasably holding said cartridge member thereon.

11. The screw alignment device of claim 7, wherein the cartridge receiving formation has means for indexing a movement of said cartridge member through or across the cartridge receiving formation.

12. The screw alignment device of claim 7, wherein the cartridge receiving formation has a forward flange and rearward flange slidably holding said cartridge member.

13. The screw alignment device of claim 12, wherein at least one of said forward and rearward flanges has at least one projection or at least one depression thereon suitable for engaging said cartridge member.

14. The screw alignment device of claim 7, wherein the cartridge receiving formation is generally planar.

15. The screw alignment device of claim 7, wherein the cartridge receiving formation is formed as part of said connector.

16. The screw alignment device of claim 7, wherein said cartridge receiving formation has discrete channel portions mounted on a rear end of said screw guide and a forward end of the tool guide.

17. The screw alignment device of claim 16, wherein connector has a concave surface cooperative with said channel portions to slidably capture or index said cartridge member.

18. The screw alignment device of claim 16, wherein a spacing of said channel portions is such that it is less than a spacing of a rail on said cartridge member to a convex outside surface said channel portions.

19. The screw alignment device of claim 7, wherein said cartridge member has a screw thread engagement means for rotating the screw on said cartridge member and for translating thereacross.

20. The screw alignment device of claim 19, wherein said screw thread engagement means has a forward holding member and a rear holding member suitable for holding each screw at a forward location and rearward location respectfully.

21. The screw alignment device of claim 20, wherein said forward holding member and rearward member are spaced relative to each other and spaced from said screw guide when in use such that as the screw is rotated so as to travel towards said screw guide, the screw travels through said rearward holding member and breaks therethrough.

22. The screw alignment device of claim 21, wherein said screw thread engagement means has series of depressions or a series of projections engageable with a thread of the screw.

23. The screw alignment device of claim 22, wherein said series of depressions is formed in a base of said cartridge member.

24. The screw alignment device of claim 23, wherein said screw thread engagement means is a holding formation which secures the screw to said base of said cartridge member, said holding formation being of a material selected from the group consisting of plastic and silicon.

25. The device of claim 24, wherein said holding formation is rigid.

26. The screw alignment device of claim 25, wherein said cartridge member has an indexing means for stopping a movement of said cartridge member when the screw is aligned with the tool and said screw guide as said cartridge member is moved in said cartridge receiving formation.

27. The screw alignment device of claim 26, wherein said indexing means having one or more projections or depressions associated with the cartridge receiving formation which will cooperate with depressions or projections on said cartridge member.

28. The screw alignment device of claim 19, wherein said cartridge member has multiple screws thereon.

29. The screw alignment device of claim 19, wherein said cartridge has a profiled cross section to accommodate a shape of the screw so that the screw can be presented to the tool with an axis of rotation of the screw being generally coincident with an axis of rotation of the tool.

30. The screw alignment device of claim 19, wherein said cartridge member is formed of a material selected from the group consisting of cardboard and polymer.

31. The screw alignment device of claim 19, wherein said cartridge member has a color such that the color represents a type of screw on said cartridge member.

32. The screw alignment device of claim 19, wherein said cartridge member has a series of pockets each of which has an outside surface which is convex.

33. The screw alignment device of claim 19, wherein said cartridge member has a series of pockets on one side.

34. The screw alignment device of claim 33, wherein said cartridge member has at least one rail portion which extends along one of a forward edge and a rear edge of the cartridge member.

35. The screw alignment device of claim 19, wherein said cartridge member having a pockets on both sides thereof, said series of pockets suitable for dispensing screws contained therein.

36. The screw alignment device of claim 19, wherein the screw is held onto said cartridge member by an adhesive.

37. The screw alignment device of claim 19, wherein the screw is dispensed from said cartridge member by an axial force or by the rotation of the screw by the tool.

38. The screw alignment device of claim 19, wherein the screw has a lubricant thereon.

39. The screw alignment device of claim 38, wherein said lubricant being selected from a group consisting of an added lubricant, a lubricant added to adhesive tape, the adhesive, and the adhesive applied to a tape.

* * * * *